April 7, 1925.
E. S. PRIDHAM ET AL
TELEPHONE CIRCUIT
Filed May 1, 1922
1,532,513
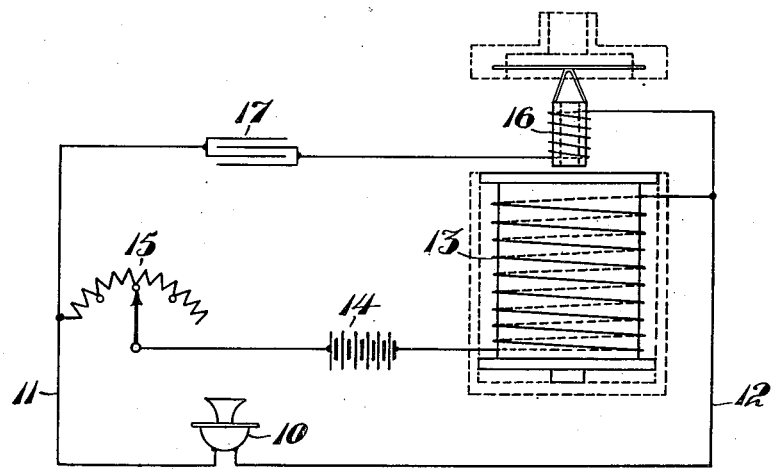
Inventors
Edwin S. Pridham
Peter L. Jensen
By Drury Strong
Townsend and Loftus.
Attorneys Patented Apr. 7, 1925.

1,532,513

UNITED STATES PATENT OFFICE.

EDWIN S. PRIDHAM AND PETER L. JENSEN, OF OAKLAND, CALIFORNIA, ASSIGNORS TO THE MAGNAVOX COMPANY, OF OAKLAND, CALIFORNIA, A CORPORATION OF ARIZONA.

TELEPHONE CIRCUIT.

Application filed May 1, 1922. Serial No. 557,516.

*To all whom it may concern:*

Be it known that we, EDWIN S. PRIDHAM and PETER L. JENSEN, citizens of the United States, residing at Oakland, county of Alameda, and State of California, have invented new and useful Improvements in Telephone Circuits, of which the following is a specification.

This invention relates to telephone circuits and has for its object to provide a simplified and improved circuit for use especially with an electro-dynamic receiver.

The type of receiver under consideration is that illustrated in our application, Serial No. 377,354, filed April 28th, 1920, entitled "Electro-dynamic receiver" and which embodies an electro-magnet and a movable coil disposed in the magnetic field and rigidly connected to the diaphragm of the sound box. Heretofore we have used separate operating circuits, one for the electro-magnetic winding and the other for the transmitter and movable coil. In the present invention we connect the electro-magnetic winding and battery in series with the transmitter and connect the movable coil with the transmitter, but in parallel with the battery and electro-magnetic winding, using the magnetic winding as a choke to prevent the modulated current from passing through the direct current circuit.

A preferred form of circuit is illustrated in diagram in the accompanying drawing.

Referring in detail to the drawing, a telephone transmitter is indicated at 10. Connected with the transmitter by wires 11 and 12 are a winding 13 for the electro-magnetic structure of the receiver, a battery 14 and a rheostat 15, forming a direct current circuit for energizing the magnetic structure of the receiver. Connected to wires 11 and 12 is the movable coil 16 of the electro-dynamic receiver and included in the movable coil circuit is a condenser 17.

In the operation of the circuit current from the battery passes through the electro-magnetic winding, the rheostat and the transmitter forming a direct current circuit for energizing the magnetic structure of the receiver. The movable coil being also connected with the transmitter, the modulated currents caused by the action of the transmitter will act upon the movable coil, since the magnetic winding will serve as a choke to prevent them from passing through the direct current circuit. The condenser is included to prevent the direct current from passing through the movable coil and also to conserve the energy in the modulated current circuit. The rheostat is included in the direct current circuit to regulate the current passing through the transmitter and electro-magnetic winding.

Various changes in the manner of connecting up this circuit may be employed without departing from the spirit of our invention as disclosed in the appended claims.

Having thus described our invention, what we claim and desire to secure by Letters Patent is:

1. A telephone circuit for use with an electro-dynamic receiver of the type mentioned comprising a battery, an electro-magnetic winding for the receiver, a transmitter connected in series with the battery and winding and a movable coil for the receiver connected with the transmitter and in parallel with the battery and magnetic winding and including the said battery and magnetic winding in its circuit, the magnetic winding acting as a choke to prevent the modulated current of the movable coil from passing through the direct current circuit.

2. A telephone circuit for use with an electro-dynamic receiver of the type mentioned comprising a battery, an electro-magnetic winding, a rheostat and a transmitter connected in series, and a movable coil connected with the transmitter but in parallel with the rheostat, battery and winding and including the said rheostat, battery and magnetic winding in its circuit, the magnetic winding acting as a choke to prevent the modulated current of the movable coil from passing through the direct current circuit.

3. A telephone circuit for use with an electro-dynamic receiver of the type mentioned comprising a battery, an electro-magnetic winding for the receiver and a transmitter connected in series, a movable coil connected with the transmitter but in parallel with the battery and magnetic winding and including the said battery and magnetic winding in its circuit, the magnetic winding acting as a choke to prevent the modulated current from passing through the direct current circuit and a condenser included in the circuit of the movable coil and preventing the direct current from passing through the removable coil.

EDWIN S. PRIDHAM.
PETER L. JENSEN.